Figure 1:
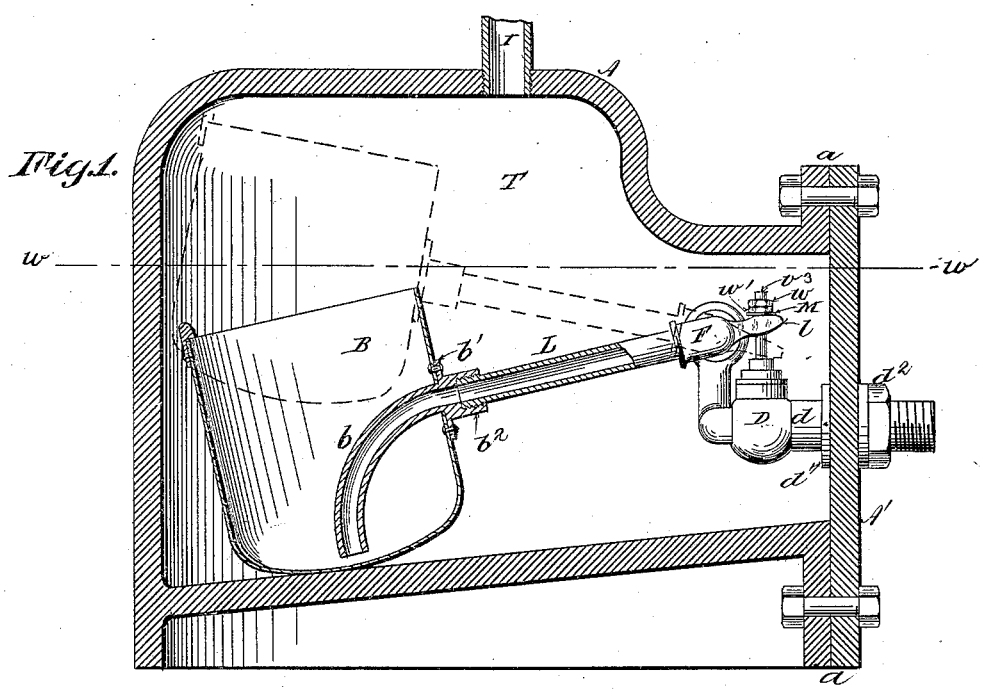

(No Model.)

2 Sheets—Sheet 1.

G. DINKEL.
STEAM TRAP.

No. 401,545. Patented Apr. 16, 1889.

Witnesses:
Inventor:
George Dinkel
By his Attorney
Geo. W. Miatt (No Model.) 2 Sheets—Sheet 2.
G. DINKEL.
STEAM TRAP.
No. 401,545. Patented Apr. 16, 1889.
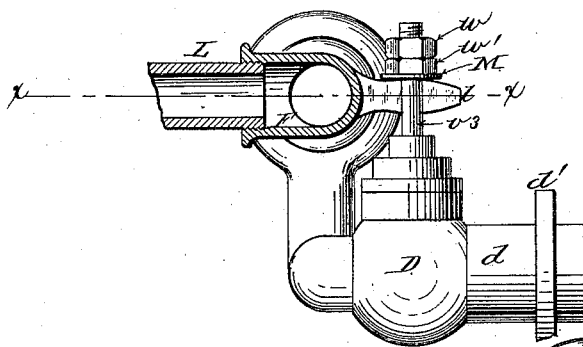
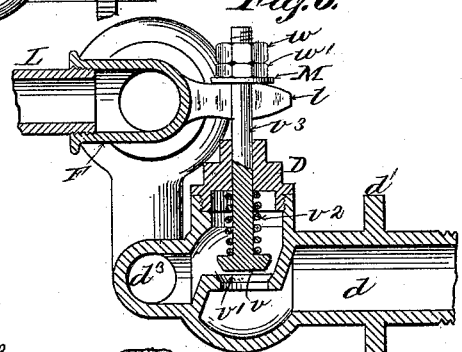
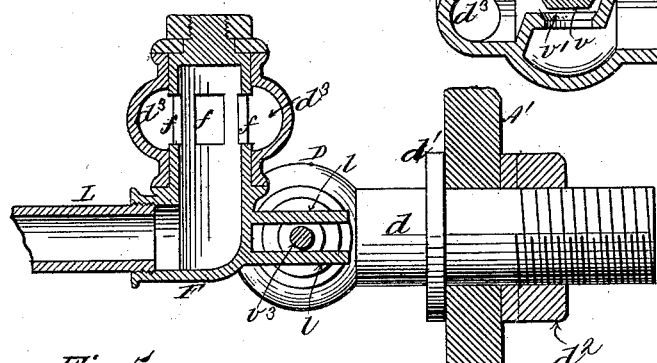
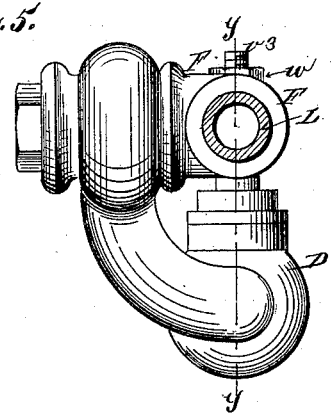
Witnesses:
D. W. Gardner
G. T. Miatt
Inventor:
George Dinkel
By his attorney
Geo. W. Miatt

UNITED STATES PATENT OFFICE.

GEORGE DINKEL, OF JERSEY CITY, NEW JERSEY.

STEAM-TRAP.

SPECIFICATION forming part of Letters Patent No. 401,545, dated April 16, 1889.

Application filed November 12, 1888. Serial No. 290,602. (No model.)

*To all whom it may concern:*

Be it known that I, GEORGE DINKEL, a citizen of the United States, residing in Jersey City, in Hudson county, and State of New Jersey, have invented certain new and useful Improvements in Steam-Traps, of which the following is a specification sufficient to enable others skilled in the art to which the invention appertains to make and use the same.

My invention relates to a steam-trap in which an open float-bucket is used, from which the liquid is discharged through a valve opened by the fall of such float-bucket, as set forth in the Patent No. 380,791, issued to me April 10, 1888.

My present invention consists in the special construction and arrangement of parts hereinafter set forth, and is designed to simplify and cheapen the construction of the trap while retaining all the essential features of the invention disclosed in said patent, by reference to which it will be seen that the main object is to render the operation of the apparatus intermittent and sudden in action, in contradistinction to the fluctuating action of other traps in which a closed float is used for the purpose of protecting the discharge-valve against "cutting."

In the patent referred to the discharge-valve is situated outside of the trap-chamber, and the liquid is conveyed to it from the float-bucket by a stationary siphon-pipe. In the present case the discharge-valve is inclosed entirely within the trap-chamber, and is operated directly by the lever-arm of the open float-bucket, which lever-arm also conveys the discharged liquid from the bucket to the valve, said arm being formed with a bent draining-tube, which extends to very near the bottom of the open float-bucket. The advantage of this construction arises not only from its simplicity and compactness of form, but also from the fact that I am enabled to discharge the whole of the water from the float-bucket, and thereby cause it to rise more rapidly, whereas in the older form the receiving end of the stationary discharge siphon-pipe had to be placed considerably above the bottom of the float-bucket to permit of the bucket rising sufficiently to close the valve, and consequently when the float-bucket fell under the overflow of liquid it fell away from the receiving end of the discharge-pipe and a considerable body of liquid remained in the float-bucket.

The accompanying drawings illustrate practical means for carrying out my improvements, although it is obvious that various modifications may be made without deviating materially from the essential features of my invention, and I do not, therefore, confine myself to the exact form and construction of parts shown.

Figure 2:
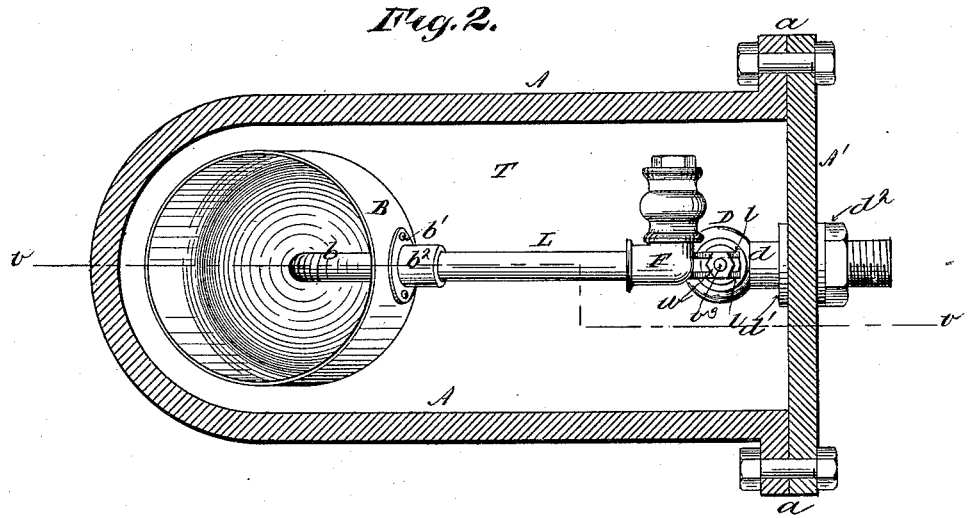

Figure 1 is a vertical longitudinal section of my improved form of trap upon plane of line $v\ v$, Fig. 2. Fig. 2 is a horizontal section of the trap upon plane of line $w\ w$, Fig. 1. Fig. 3 is a side elevation of the discharge-valve, showing the inner end of the float-lever and its fulcrum in section. Fig. 4 is a horizontal section of the inner end of the fulcrum-piece, &c., upon plane of line $x\ x$, Fig. 3, showing a plan of the discharge-valve; Fig. 5, a transverse section of the bucket-lever, showing the discharge-valve in elevation; Fig. 6, a vertical section of the discharge-valve upon plane of line $y\ y$, Fig. 5.

The trap-chamber T may be of any desired size or shape. As shown in the drawings, it is formed by an elongated casting, A, shaped to conform to the size and movements of the float-bucket B, lever L, and discharge-valve D, and is closed by a head, A', bolted to the flanges $a\ a$.

The discharge-valve D may be conveniently attached to the inner side of the vertical head or cover A', or otherwise supported within the chamber T. As shown, the exit-passage $d$ is formed with an annular flange, $d'$, which is held against the inner side of the head A' by a nut, $d^2$, screwing upon the outer end of said exit-passage $d$, which latter is coupled to the ordinary discharge-pipe in any ordinary or well-known manner.

The valve D may be of any desired class or form, the globe-valve shown being a convenient form for use in this connection. The valve-disk $v$ is held tightly against its seat $v'$ by a spring, $v^2$, when not raised by the lever L.

The inner end of the bucket-lever L is formed with one or more short arms, $l\ l$, which project under a shoulder, M, upon the upper part of the valve-stem $v^3$ and raise the latter when the bucket falls. This abutment or shoulder M is preferably made adjustable upon the upper part of the valve-stem $v^3$, for the purpose of regulating the time and extent of opening of the valve effected by the inner arms, $l\,l$, of the lever L upon the descent of the bucket B. A simple way of effecting this adjustability is to form the upper end of the valve-stem $v^3$ with a screw-thread, with which two jam-nuts, $w\,w'$, engage, the lower one constituting the shoulder M. The fulcrum F is hollow, and is formed with openings or ports $f\,f$, which open into the inlet-passage $d^3$ of the discharge-valve D. The lever L is also hollow, and its inner end is secured to and communicates with the hollow fulcrum F. The outer end of the float-lever L is continued into the bucket B and descends therein to within a short distance of the bottom, so that practically all the liquid may be drained from the bucket. A convenient way of forming this draining-tube $b$ is to cast it in the form of a bent pipe having a flange, $b'$, near its upper extremity and a socket, $b^2$, for the reception of the outer end of the lever L. The drainer $b$ can then be passed through a perforation in the side of the bucket B, (which is preferably made of sheet metal,) so that its flange $b'$ rests against the exterior, and then riveted in place.

The inlet I for the liquid of condensation, steam, &c., enters the chamber A at any desired point, preferably behind the float B.

The operation of the apparatus will be readily understood. The collection of liquid in the trap raises the float B and allows the valve D to close. The further accumulation of liquid eventually flows over the sides and into the float-bucket B, causing the latter to fall and the short arms $l\,l$ of the lever to raise and hold up the shoulder M, valve-stem $v^3$, and valve-disk $v$ against the resistance of the spring $v^2$. Under these conditions the excess of pressure within the trap causes the liquid in the bucket to pass up the drainer $b$ through the hollow lever L, hollow fulcrum F, down through the valve-inlet passage $d^3$, and out through the valve D. Relieved of the weight of water, the float-bucket B again rises and the operation is repeated when sufficient liquid has again accumulated.

What I claim as my invention, and desire to secure by Letters Patent, is—

1. In a trap substantially such as set forth, the combination, in the inclosed chamber T, of the open float B, drain-pipe $b$, hollow lever L, and hollow fulcrum F, with the discharge-valve D, interposed in the discharge-passage and operated by the short arm $l$ of the lever L, substantially in the manner and for the purpose described.

2. In a trap substantially such as designated, the combination of the closed chamber T, open float B, hollow lever L, having the hollow fulcrum F, communicating with the discharge-passage, and the short arm $l$, for raising the valve-disk $v$ from its seat $v'$, and the valve D, interposed in the discharge-passage and provided with the retractile spring $v^2$, for closing the valve, substantially in the manner and for the purpose described.

3. In a trap substantially such as described, the combination of the closed chamber T, open bucket B, hollow lever L, short arm $l$, hollow fulcrum F, passage $d^3$, valve-disk $v$, stem $v^3$, retractile spring $v^2$, valve-seat $v'$, and discharge-passage $d$, the whole arranged and operating substantially in the manner and for the purpose described.

4. In a trap substantially such as set forth, the combination, in the closed chamber T, of the open bucket B, drain-pipe $b$, hollow lever L, hollow fulcrum F, and short arm $l$, with the discharge-valve D, interposed in the discharge-passage and formed with the retractile spring $v^2$ and adjustable shoulder M upon the valve-stem $v^3$, substantially in the manner and for the purpose set forth.

GEORGE DINKEL.

Witnesses:
D. W. GARDNER,
GEO. W. MIATT.